United States Patent [19]

Byrne et al.

[11] Patent Number: 4,869,454

[45] Date of Patent: Sep. 26, 1989

[54] GROMMET

[76] Inventors: Thomas W. Byrne, 402 Barry Pl., Placentia, Calif. 92670; Thomas J. Muella, 13644 Searson Dr., Moreno Valley, Calif. 92388

[21] Appl. No.: 98,625

[22] Filed: Sep. 21, 1987

[51] Int. Cl.⁴ .............................................. F16L 5/00
[52] U.S. Cl. ........................................ 248/610; 16/2; 174/153 G
[58] Field of Search .................. 248/610, 635, 60, 56, 248/317; 174/153 G, 153 R, 138 D; 16/2

[56] References Cited

U.S. PATENT DOCUMENTS

| | | | |
|---|---|---|---|
| 1,042,747 | 10/1912 | Ziegler | 174/153 R |
| 1,932,456 | 10/1933 | Gaston | 174/153 R |
| 2,592,130 | 4/1952 | Erb . | |
| 2,682,570 | 6/1954 | Elliott | 174/153 R |
| 2,868,868 | 1/1959 | Corey | 174/153 R |
| 3,016,562 | 1/1962 | Reid . | |
| 3,056,852 | 10/1962 | Sachs | 174/153 G |
| 3,076,668 | 2/1963 | Famely . | |
| 3,091,795 | 6/1963 | Budwig | 174/153 G |
| 3,493,205 | 2/1970 | Bromberg . | |
| 3,678,535 | 7/1972 | Charles . | |
| 3,725,973 | 4/1973 | Gwozdz . | |
| 3,843,833 | 10/1974 | Nicholson . | |
| 4,033,535 | 7/1977 | Moran . | |
| 4,089,496 | 5/1978 | Mizusawa | 16/2 X |
| 4,100,368 | 7/1978 | Thomsen | 174/138 D |
| 4,163,136 | 7/1979 | Piber . | |
| 4,304,148 | 12/1981 | Hamman | 248/56 X |
| 4,385,777 | 5/1983 | Logsdon . | |
| 4,656,689 | 4/1987 | Pennis . | |

FOREIGN PATENT DOCUMENTS 1221728 1/1960 France ............................ 174/153 G Primary Examiner—Ramon O. Ramirez
Assistant Examiner—Robert A. Olson
Attorney, Agent, or Firm—I. Michael Bak-Boychuk

[57] ABSTRACT

A resilient grommet assembly useful in isolating the transfer of acoustical energy across structural connections includes a first annular portion provided with a central tubular projection in concentric deployment within a first peripheral edge and a second, mating annular portion provided with a second peripheral edge, the first edge extending to a depth greater than the second edge. The tubular projection is then inserted into a circular hole in a hanger strap and thereafter into a central opening in the second portion. A fastener then compresses the portions against the hanger and since the depth of the first edge is greater than the second edge the first edge is collapsed to a greater extent to further drive the tubular projection into the second portion.

3 Claims, 1 Drawing Sheet

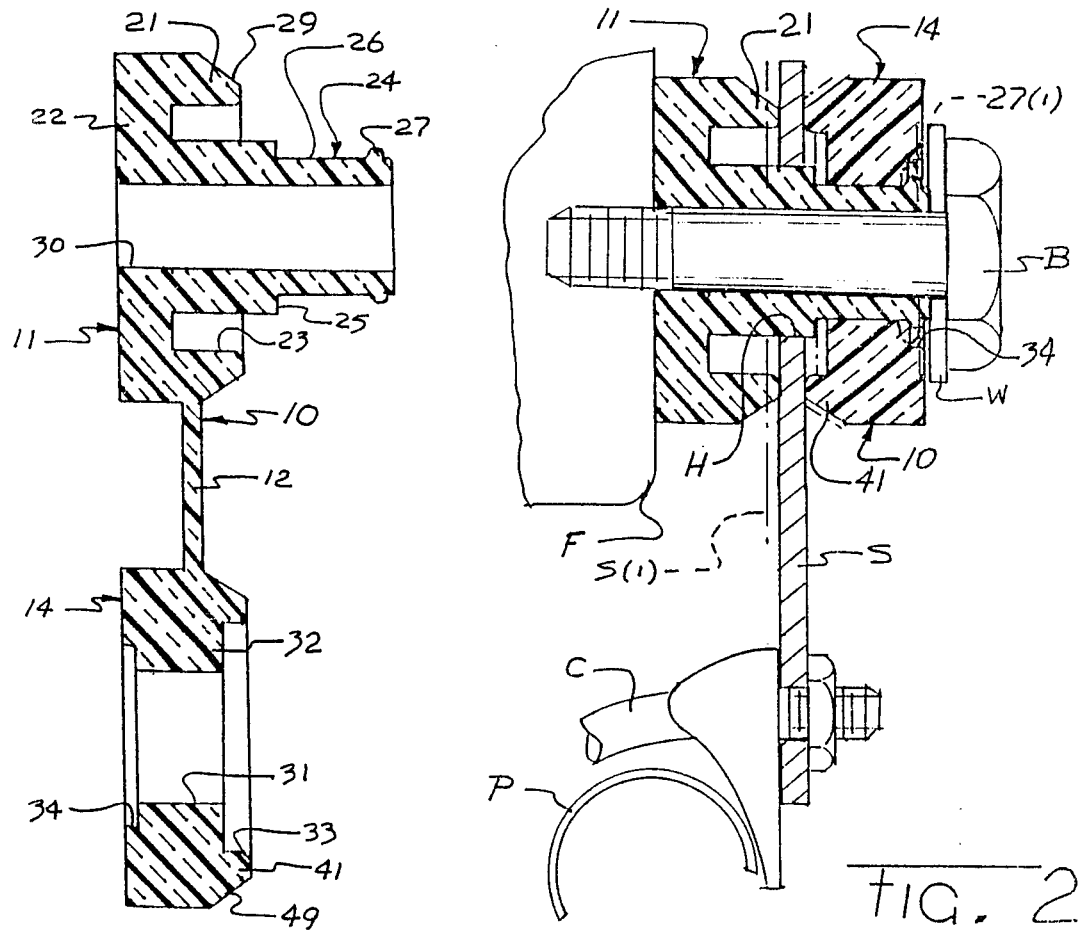
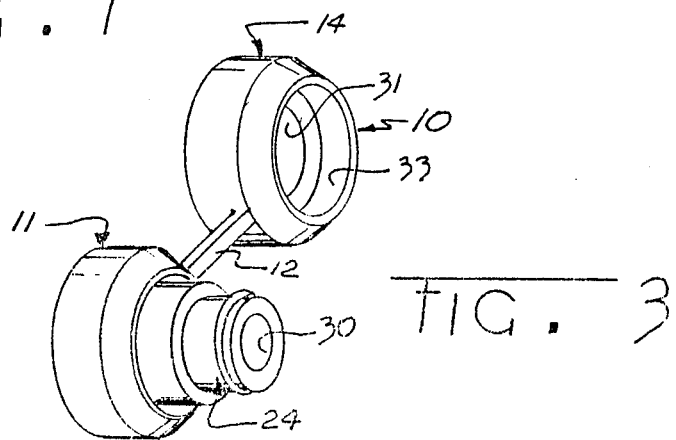

GROMMET

BACKGROUND OF THE INVENTION

1. Field of the Invention

The present invention relates to sound isolation devices, and more particularly to resilient grommets for attenuating exhaust noise from the body of an automobile.

2. Description of the Prior Art

The operation of a motor vehicle invariably entails the emission of exhaust noise. This noise is then directed and confined to the exhaust pipes and the muffler wherein it is acoustically cancelled or attenuated. In practice the exhaust pipe extends from the internal combustion engine in the motor vehicle to the muffler suspended from its lower surfaces. Since an internal combustion engine is resiliently mounted to the vehicle the exhaust system acts as an efficient carrier of mechanical noise associated with the vibrations of the engine and the acoustic noise of internal combustion. In consequence great attention must be exercised in isolating the exhaust system from the body panels of the vehicle. Simply, unless the mechanical transfer of noise is attended the whole purpose of the muffler is defeated since the large body panels of the vehicle are extremely efficient in converting mechanical energy back to acoustic form.

Accordingly various resilient mounting arrangements have been devised in the past which effectively isolate the exhaust system from the vehicle frame. In one form such resilient mounting arrangements include one or more elastomeric grommets surrounding the fasteners of the exhaust mounts. Thus the prior art includes a variety of annular grommet examples useful for this purpose. In each instance, however, the grommet alignment presents installation difficulty and those engaged in exhaust system repairs often expend substantial labor in effecting proper mounting.

A resilient grommet assembly which effects installation alignment and alignment with use is therefore extensively sought and it is one such assembly that is disclosed herein.

SUMMARY OF THE INVENTION

Accordingly it is the general purpose and object of the present invention to provide a resilient grommet assembly conformed in compliance for self effecting alignment.

Other objects of the invention are to provide an annular grommet set in which the parts of the set are shaped for centering compliance.

Yet further objects of the invention are to provide a resilient grommet assembly which is convenient in use and inexpensive in fabrication.

Briefly, these and other objects are accomplished within the present invention by providing two annular grommet pieces each substantially of a cylindrical section, the first including a tubular central projection or tube receivable in the annulus of the second. Both the first and the second annular piece include a peripheral or circumferential edge extension, the edge extension of the first piece extending to a greater dimension than the edge extension on the second piece. Thus the edge extension on the first piece forms a circular cavity around the central tube to a depth greater than the cavity formed around the annulus of the second piece by its edge extension.

Both the first and the second annular pieces may be formed from resilient material, preferably from elastomers like neoprene, polyurethane or similar elastomeric polymers. In consequence the deeper edge extension of the first piece will be more compliant to axial loading than the shallower edge extension on the second piece.

In addition, the central tube extending through the cavity of the first piece is formed to an enlarged sectional dimension over a portion of its inner length, with the outer portion thereof being formed for mating receipt in the annulus of the second piece. This enlarged sectional dimension extends axially on the central tube beyond the edge extension. A hanger strap provided with a circular opening conformed to the dimensions of the enlarged section is then mounted onto the central tube and the second piece is then passed onto the reduced outer portion thereof extending to the other side of the strap. A threaded fastener inserted into the interior of the tube then, by threaded advancement, compresses both pieces against the strap.

In the course of this compression the deeper, and thus more compliant, edge extension on the first piece deforms to a larger extent than the deformation of the shallower edge extension of the second piece. Accordingly, the enlarged section portion of the central tube is pushed through the strap opening in the course of compression until it abuts the annulus of the second piece. In this manner the course of compression of the grommet assembly effect centering of the strap on the enlarged section of the tube. This provides the necessary resilient material bulk between the strap and the fastener to isolate the transfer of mechanical energy in all modes of motion.

BRIEF DESCRIPTION OF THE DRAWINGS

FIG. 1 is a sectional view of the inventive grommet assembly in its unused form.

FIG. 2 is yet another sectional view of the inventive grommet assembly in its installed arrangement; and FIG. 3 is a perspective view of the inventive grommet assembly in its separated forms.

DESCRIPTION OF THE PREFERRED EMBODIMENT

As shown in FIGS. 1-3 the inventive grommet assembly, generally designated by the numeral 10, comprises a first, substantially annular, grommet piece 11 joined by a strap 12 to a second annular grommet piece 14. Both grommet pieces 11 and 14 may be formed of a resilient material structure such as neoprene, polyurethane or some of the latex based polymers cast or injected as a single article together with the strap 12. Both grommet pieces, moreover, may be formed to substantially equal exterior planforms each generally formed as a cylindrical segment of substantial elastomeric mass to absorb mechanical energy.

Those skilled in the art will appreciate that the transfer of mechanical energy is largely determined by the mechanical geometry. Thus, by particular reference to FIG. 2, an exhaust pipe P is typically engaged by a clamp C which then becomes an attachment point picked up or affixed to the end of a support strap S. The upper end of the support strap S is then attached at the vehicle frame or body portion F. This manner of suspension is generally typical for most motor vehicles and, with some variation, is the technique utilized by those effecting exhaust system repairs. This manner of suspension, however, transfers with some efficiency the mechanical energy of the exhaust system back into the body of the motor vehicle which then becomes amplified into acoustic energy by the rather large panels thereof.

Accordingly a resilient interface is necessary in the connection to decouple all the modes of motion of the exhaust components from the vehicle frame. This resilient interface, of necessity, must lend itself for installation convenience and must retain its effectiveness for long periods of use.

One mode of mechanical transfer particularly pernicious is the transfer of mechanical energy in angular (rotary) form. This energy mode resolves itself in unpredictable excitations of body panels at the fastener attaching the strap and the resilient isolation device must therefore attenuate angular motion with some effect.

This aspect is particularly well accommodated in the structure of the grommet assembly 10 as shall now be set forth. More specifically, piece 11 is characterized by a peripheral edge extension 21 extending on one side of an annular disc portion 22 to form a dished cavity 23 therewith. A central tube 24 then extends centrally from the disc portion 22 through the cavity 23 to emerge therefrom. Some distance beyond the cavity edge 21 tube 24 is provided with a shoulder 25 reducing its section to a reduced segment 26 which, proximate its free end, is provided with an extension peripheral bead 27. The exterior surface of segment 26, moreover, is dimensioned for mating receipt in the annulus 31 of piece 14.

Similar to piece 11, piece 14 comprises a disc portion 32 around annulus 31 again provided with a peripheral edge extension 41 to form a cavity 33 on one side thereof. In distinction with cavity 23 cavity 33 is formed to a lesser depth and the edge extension 41 is thus of substantially lower height. Disc 32 is thus left with substantial material mass useful in isolating mechanical energy. A circular relief recess 34 is then formed on the other side of piece 14 in concentric alignment around annulus 31.

Both the edge extensions 21 and 41, moreover, include exterior peripheral chamfers 29 and 49 and thus taper towards their free edge. As a result the resilient compliance of each edge extension is geometrically determined, the higher column dimension of edge extension 21 resulting in lower axial stiffness therein.

The foregoing geometry is used to advantage in mounting. By particular reference to FIG. 2 the inventive grommet assembly 10 is first mounted on strap S by insertion of the tube 24 into a conforming hole H proximate one end of the strap. In this alignment piece 11 is brought into contact at the edge extension 21 with the side surface of the strap. The other piece 14 is then aligned to the other side of the strap and mounted on the reduced tube section 26. Tube section 26 thus passes through the annulus 31 and is retained in this position by expansion of the bead 27 into the circular recess 34. Thereafter a bolt B (or other threaded fastener) is passed through the bore 30 in the interior of tube 24 to advance a washer W against the end of the tube. Further threaded advancement of the bolt B into the frame F then compresses the tube end with the consequent hoop expansion extending into the recess 34 (at 27(i)). Concurrently both edge extensions 21 and 41 are compressed. Since extension 21 is more compliant axially than extension 41 a consequent lateral shift of strap S on tube 24 results (at S(1)) until the shoulder 25 abuts against the opposed surface of disc 32. Consequently strap S is maintained on the enlarged portion of the tube 24 between edges 21 and 41 which are geometrically shaped for compliance.

In this manner a convenient resilient mount is devised which is geometrically determined both in angular and linear compliance.

Obviously, many modifications and changes may be made to the foregoing without departing from the spirit of the invention. It is therefore intended that the scope of the invention be determined solely on the claims appended hereto.

What is claimed is:

1. A grommet assembly useful in isolating the mechanical energy transmitted through a strap suspending an article from a fastener onto which suspension is made, said strap including a circular suspension hole, comprising:

a first annular, resilient fitting including a central tubular projection extending therefrom and a first peripheral edge in concentric alignment around said tubular projection, said first peripheral and said tubular projection defining a first annular cavity therebetween said tubular projection including a cylindrical enlarged portion extending beyond said first annular cavity conformed to pass through said suspension hole in said strap and a cylindrical reduced portion extending therefrom, with a shoulder extending between the enlarged end reduced portion; and a second annular resilient fitting including a second peripheral edge extending on one side thereof around a central opening conformed to receive said reduced portion of said tubular projection and to oppose said enlarged portion thereof, said first peripheral edge extending from said first portion to a dimension greater than the dimension of said second edge around said second portion.

2. Apparatus according to claim 1 further comprising:
flexible connection means extending between said first and second portions.

3. Apparatus according to claim 2 wherein:
said tubular projection is conformed to receive said fastener on the interior thereof.

* * * * *